United States Patent [19]

Au et al.

[11] Patent Number: 4,847,817
[45] Date of Patent: Jul. 11, 1989

[54] BROADBAND SONAR SIGNAL PROCESSOR AND TARGET RECOGNITION SYSTEM

[75] Inventors: Whitlow W. L. Au, Kailua, Hi.; Douglas W. Martin, San Diego, Calif.

[73] Assignee: The United States of America as represented by the Secretary of the Navy, Washington, D.C.

[21] Appl. No.: 140,189

[22] Filed: Dec. 31, 1987

[51] Int. Cl.⁴ .............................................. H04B 1/06
[52] U.S. Cl. .................................. 367/135; 367/93; 367/87
[58] Field of Search .................. 367/87, 93, 131, 135, 367/136; 73/602

[56] References Cited

U.S. PATENT DOCUMENTS

| | | |
|---|---|---|
| 3,803,336 | 4/1974 | Williams ................................. 434/9 |
| 3,835,234 | 9/1974 | Murphree ............................... 434/9 |
| 3,872,443 | 3/1975 | Ott . | 
| 3,996,791 | 12/1976 | Niklas et al. .......................... 73/602 |
| 4,084,148 | 4/1978 | Koshikawa . | 
| 4,119,940 | 10/1978 | Keating et al. . | 
| 4,382,291 | 5/1983 | Nakauchi ................................ 367/93 |
| 4,439,845 | 3/1984 | Geohegan, Jr. et al. ............. 367/87 |
| 4,446,542 | 5/1984 | Beckerle ............................. 367/131 |
| 4,456,982 | 6/1984 | Tournois .............................. 367/11 |
| 4,470,048 | 9/1984 | Short, III . |

Primary Examiner—Thomas H. Tarcza
Assistant Examiner—Tod Swann
Attorney, Agent, or Firm—Harvey Fendelman; Thomas G. Keough

[57] ABSTRACT

Target discrimination involves processing of sonar echoes in the time-domain and using features of the targets that the human auditory system uses (time separation and amplitude of echo highlights). Known targets are placed in the water and ensonified by multiple broadband transient signals. Echoes from each of the known targets have time-domain feature data extracted and stored to construct a library of known target features. Unknown targets echoes of transmitted multiple broadband transient signals are received and time-domain feature data is extracted from these. A comparison of the unknown target echo features with the known target echo features provides a discrimination of the unknown target echoes.

3 Claims, 4 Drawing Sheets

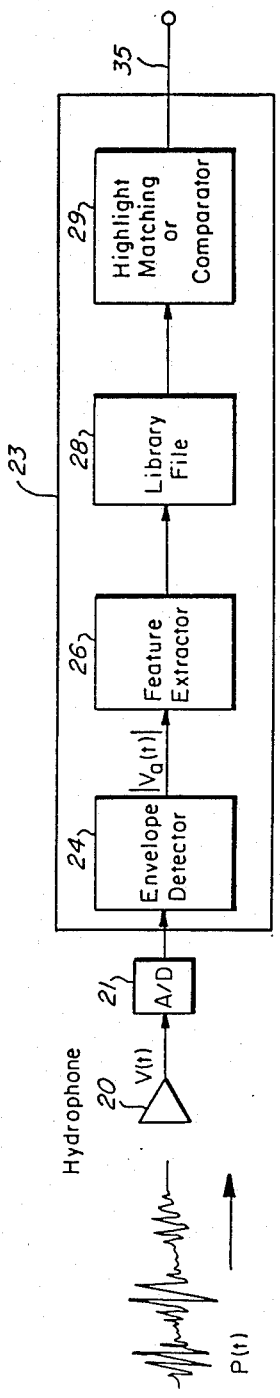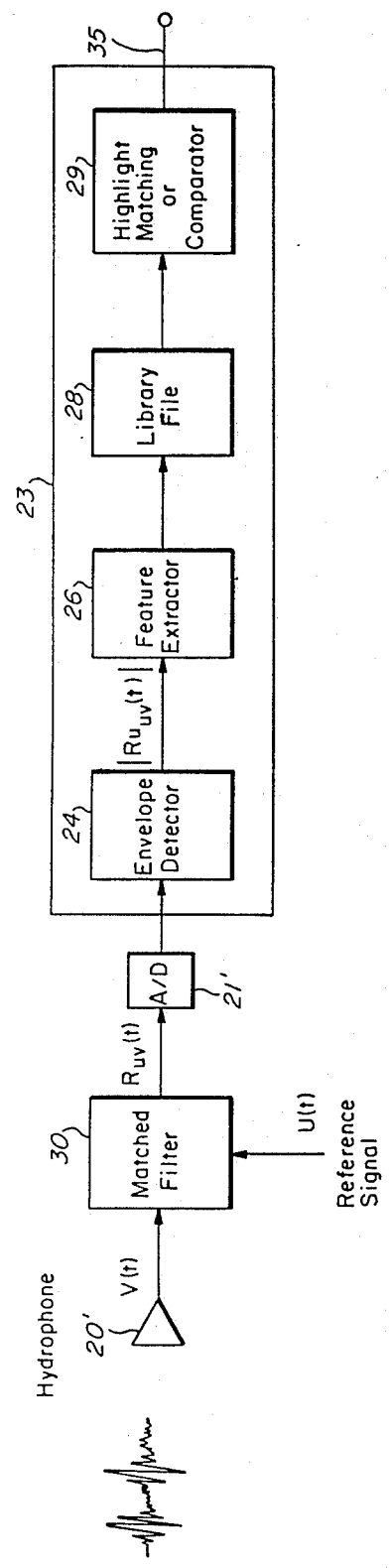
FIG. 4
FIG. 3

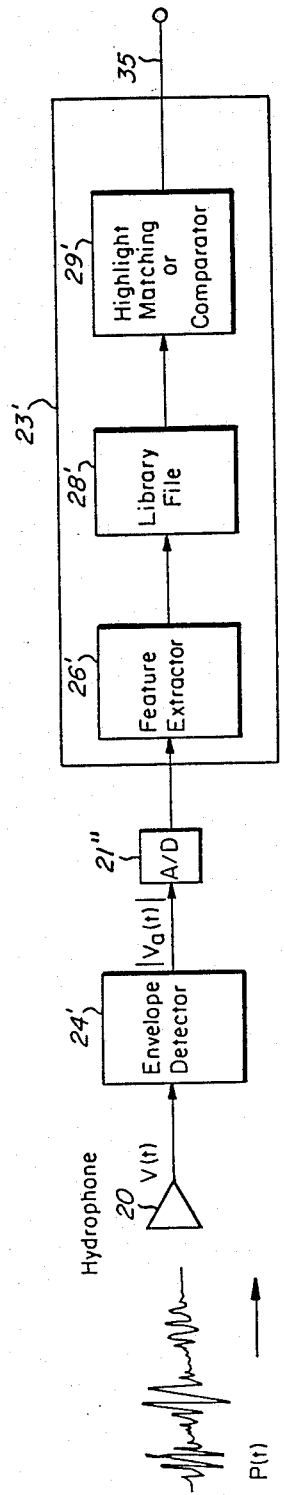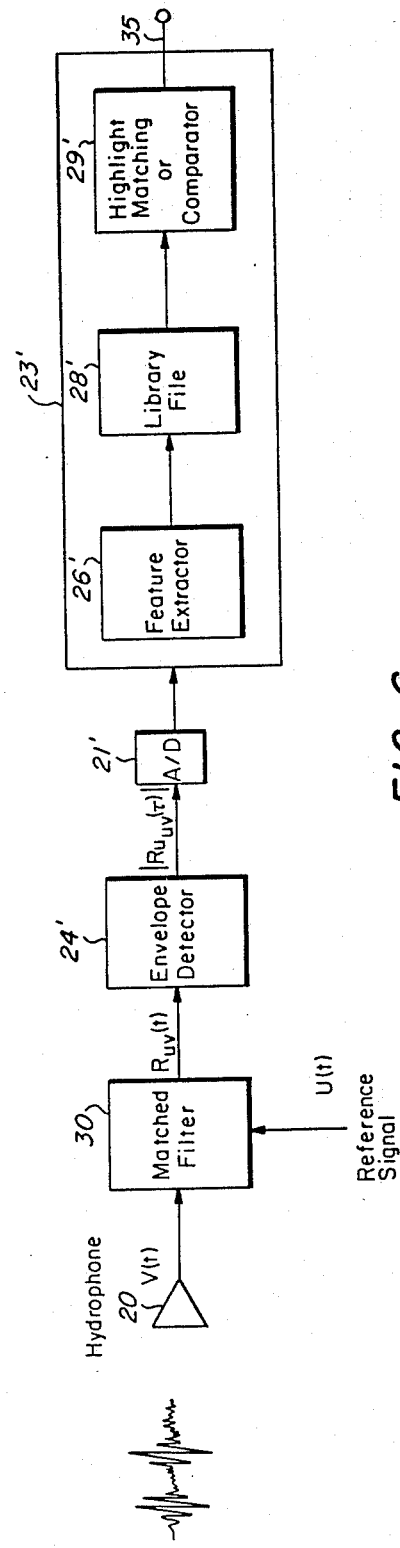
FIG. 5
FIG. 6

BROADBAND SONAR SIGNAL PROCESSOR AND TARGET RECOGNITION SYSTEM

STATEMENT OF GOVERNMENT INTEREST

The invention described herein may be manufactured and used by or for the United States of America for governmental purposes without the payment of any royalties thereon or therefor.

BACKGROUND OF THE INVENTION

Conventional sonars all lack, in one degree or another, the ability to recognize and discriminate targets of interest. This limitation seems to affect all sonars which attempt to discern targets of interest from false targets which are either stationary or moving very slowly (low-doppler targets). Narrow band sonars lack sufficient range resolution and information capacity to perform target discrimination. Most broadband sonar processors work only under ideal conditions in which there are high signal-to-noise ratios since they are inclined to perform poorly in conditions of moderate and low signal-to-noise ratios. In addition, the ability to generalize target features tends to be lacking so that the broadband sonar processors require the storage capability for unwieldy amounts of information on all possible targets in all possible orientations. As a consequence, broadband sonar technology is unsatisfactory as can be seen by the lack of a single operational broadband pulsed active sonar system.

Thus a continuing need exists in the state-of-the art for providing a high-resolution, broadband pulse sonar that is able to recognize and discriminate between underwater targets.

SUMMARY OF THE INVENTION

The present invention is directed to providing a method of utilizing sonar for target discrimination. Known targets are placed in the water and ensonified by multiple broadband transient signals. Echoes from each of the known targets are received and time-domain feature data are extracted. The time-domain feature data are time separation and amplitude of echo highlights which are utilized by the human auditory system. Unknown targets are ensonified by multiple broadband transient signals and echoes are received which have timedomain featured data extracted in the same manner as for the known targets. The time-domain feature data from the known and from the unknown targets are compared to enable the recognition and discrimination of the unknown targets.

OBJECTS OF THE INVENTION

It is an object of the invention to provide a signal processing technique associated with high-resolution, broadband pulse sonar for discriminating between underwater targets.

Another object of the invention is to provide a signal processing technique for sonar that can recognize and discriminate between targets in noisy and reverberant backgrounds.

Another object is to provide for a signal processing technique for sonar echoes in the time-domain by using features of targets that the human auditory system recognizes.

Still yet another object is to provide for a signal processing of sonar echoes using the features of time separation and amplitude of echo highlights for discriminating between underwater targets.

Still a further object is to provide for a technique of broadband sonar signal processing that is uncomplicated and implemented by a high-speed computer.

It is a further object to provide a signal processing technique for sonar echoes having a vastly improved target recognition and discrimination capability of stationary or slowly moving targets than is presently possible using narrow band sonar.

These and other objects of the invention will become more readily apparent from the ensuing specification when taken in conjunction with the appended drawings and claims.

DESCRIPTION OF THE DRAWINGS

FIG. 3 sets forth the components for determining a target.

FIG. 4 is a block diagram of the components for recognizing unknown targets when signal-to-noise ratios are at lower values.

FIGS. 5 & 6 are variations of the embodiment of FIGS. 3 and 4.

DESCRIPTION OF THE PREFERRED EMBODIMENT

Research has shown that the human auditory system can make fine target discriminations that greatly exceed the capabilities of man-made sonar systems. Human hearing experiments have used simulated dolphin sonar signals to probe targets. It has been learned that the capabilities of the human auditory system that rely upon the time separations and the amplitudes of echo highlighting allow for a fine target discrimination that, in fact, may rival the capabilities of dolphins and other marine mammals. Humans have demonstrated capabilities to use broadband sonar echoes to determine shape discrimination, material composition discrimination, internal structure discrimination and target detection in clutter. Most of the discriminations appear to have been accomplished in the time-domain using target features such as the number of highlights, amplitudes, separations (in time), and rise times.

The broadband pulse sonar signal processing technique of this concept is modeled to advantageously employ the methods used by humans in processing and recognizing sonar echoes. The time domain features of targets that are based on the same cues used by humans are utilized to discriminate and recognize targets.

Figure 1:
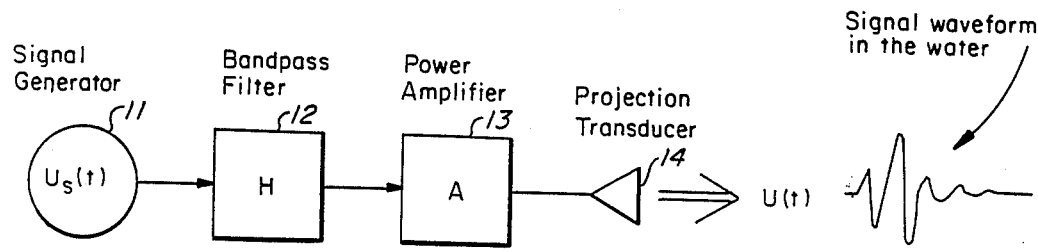
FIG. 1 is a block diagram showing the elements necessary for producing the transmitted signal.

Referring now to FIG. 1 of the drawings, a projected signal U(t) is a broadband transient-like signal with a Q (ratio of the peak frequency to a 3 dB bandwidth) of between 2.5 and 3.5. An apparatus to generate an appropriate signal U(t) and project it into the water includes a signal generator 11 producing a single cycle sine pulse $U_s(t)$ at a center frequency $\omega_o$ and of duration (T). $U_s(t)$ is equal to the expression sine $\omega_o(t)$ where 0 is less than (t) which is less than T. When other than these conditions prevail, $U_s(t) = 0$. An interconnect bandpass filter 12 is appropriately designed to have an independently varying gain ($H_o$), center frequency ($\omega_o$) and bandwidth ($\Delta\omega$) which is the same as the center frequency of the signal generator. The Q of the filter is adjusted so that an exponentially decaying sine pulse is provided for transmission every four to seven periods. The transfer function H(ω) of the filter is expressed as:

$$H(\omega) = \frac{H_o\left(\frac{\omega_o}{Q}\right)S}{S^2 + \left(\frac{\omega_o}{Q}\right)S + \omega^2}$$

where:

$$Q = \frac{\omega o}{\Delta \omega}, S = j\omega, j = \sqrt{-1}$$

An appropriate amplifier 13 receives the decaying sine pulse and feeds it to a projection transducer 14 so that the projected signal U(t) is transmitted that has a Q of approximately 2.5 to 3.5.

Figure 2:
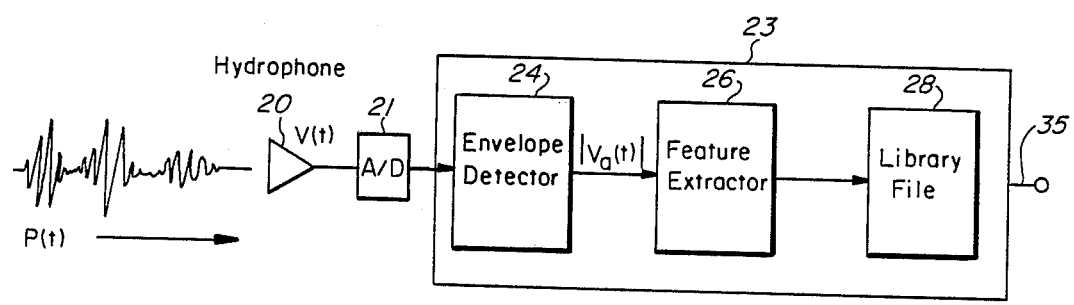
FIG. 2 is a block diagram representation of the principle constituents for determining known target features.

Looking now to FIG. 2 determination of the target features relies on the appropriate processing of acoustic echo waveforms V(t) from a known target. The known target waveform V(t) coming, for example from a known target in a test pool environment, is received by a hydrophone 20 which has an appropriate response for receiving these signals of interest. The hydrophohe transforms the impinging acoustic echo waveform into an electrical analog representation of the echo waveform from the hydrophone and an interconnected analog to digital converter 21 provides a digital representation. A computer 23, a model PDP of Digital Equipment Corporation, receives the digital form of signal V(t) to provide an envelope of the electrical echo waveform in an envelope detector section 24. This envelope is obtain by firt performing an FFT fast Fourier Transform on the signal, multiplying the frequency domain signal, V(f) which is now a complex variable by $-j$, where $j = \sqrt{-1}$. Referring now to the text by W. S. Burdic entitled *Radar Signal Analysis*, pp 149-152. Prentiss Hall, Englewood Cliffs, N.J. (1968), the Hilbert transform of the envelope signal is expressed:

$V_a(t) = V(t) + j\tilde{V}(t) =$ an analytic signal where
$\tilde{V}(t) =$ Hilbert transform of V(t)

$j = \sqrt{-1}$

The Hilbert transform V(t) is obtained by performing the inverse fast Fourier transform, FFT−1 on the variable $-j\tilde{V}(f)$, see the Burdic article. This relationship is expressed as:

$$V(t) = \begin{cases} F^{-1}[-jV(f)] f > 0 \\ F^{-1}[jV(f)] f < 0 \end{cases}$$

where F−1 [ ] is the inverse Fourier Transform of quantity within [ ] and
V(f) is the Fourier Transform of $V(t) = F[V(t)]$ An analytic signal thus is created using the Hilbert Transform variable $\tilde{V}(t)$ as the imaginary part of the analytic variable $V_a(t)$. The envelope of the signal V(t) is then the absolute value of $V_a(t)$ as shown:

$$|V_a(t)| = \sqrt{V^2(t) + \tilde{V}^2(t)}$$

A physical embodiment of an envelope detector section 24 such as that theoretically discussed above is routinely constructed by one skilled in the art to which this invention pertains by fabricating the structure from suitable components available to those involved in this particular field of art. As such, fabrication of such a detector is well within the purview of one skilled this particular art.

The envelope absolute value of $|V_a(t)|$ is fed from envelope detector section 24 to a feature extractor section 26 of computer 23. The computer is a commercially available general purpose computer, for example, a PDP model marketed by the Digital Equipment Corporation as mentioned above, has proven to be acceptable unit to be programmed appropriately so as to accomplish the attended functions of this concept. An IBM-PC could be used as well as other suitable computers. For the function of feature extraction in section 26, the PDP was appropriately programmed by a computer algorithm as set out in Appendix A to take the envelope of the signal $|V_a(t)|$ and determine amplitude and time of occurrence of each peak of the envelope detected signal. All peaks in this context are echo highlights from the sonar signal reflecting different parts of a target or from the signal, penetrating into the target and returning to the sonar via a different path within the target.

The algorithm of Appendix A has been found to appropriately identify the position and amplitude of echo highlights by determining the relative time at which the slope of the enveloped detected signal changes from positive to negative (points of relative maxima). Small amplitude extrema in the neighborhood of a larger maximum are not considered highlights and are rejected. The identified echo highlights are then assigned separation and amplitude ratios relative to the time and amplitude of the highlight with the largest amplitude.

A known target is ensonified by at least 10 pings and the group of 10 echoes is used to obtain a statistical description of each feature, including the mean number of highlights and the probability of occurrence of each highlight in the echoes. Each amplitude ratio and time separation is then treated as a Gaussian random variable with means and standard deviation determined from the echoes.

A highlight matching algorithm shown in detail in the algorithm of Appendix B, aligns data from each ping by first aligning the absolute maxima of each pair of echoes and then grouping highlights with similar time delays. The amplitude ratios, time separations, and probability of occurrence of each highlight are stored in a library file portion 28 in the memory of computer 23.

These amplitude ratios, time separation, and probability of occurrence of each highlight are considered the important features of a known target when ensonified from a specific aspect. When known targets are discovered to have echo structures which vary as a funtion of the aspect of ensonification, target features can be obtained for the different aspects and appropriately stored in library file portion 28 of computer 23.

After a library of known target features has been collected and stored in library file portion 28, an examination of unknown target can be made in accordance with the apparatus and method of this concept. If the operational environment is not acoustically or electrically hostile so that the echo-to-noise ratio is high (greater than 20dB), the time-domain features of the unknown target can be extracted using the procedure outlined above with the apparatus of FIG. 2.

If, on the other hand the signal-to-noise ratio is poor (less than 20 dB), the echo representative signal V(t) from the unknown target is passed through a matched filter 30 such as that associated with the apparatus and device of FIG. 3, where a reference signal is the time-waveform representative signal of the projected signal, U(t). The match-filter operation performs a cross-correlation calculation between V(t) and U(t). This, in the frequency domain is expressed as the product of V(f) and U*(f), where U*(f) is the complex conjugate of U(f). The output of the matched filter 30 is digitized in an analog to digital converter 21' is fed to an envelope detector section 24 within computer 23 that has the feature extracted portion 26 and library file portion 28 such as that discussed above and a highlight matching or compartor section 29 to be discussed below.

Matched filter 30 is fabricated from proven designs in accordance with techniques well established in the art so that an output signal $R_{uv}(t)$ is created which can be expressed as:

$$R_{uv}(t) = \int_{-\infty}^{+\infty} V(\tau)U(t+\tau)d = F^{-1}[V(f)U^*(f)],$$

A digitized output of the matched filter, $R_{uv}(t)$ from A/D 21' is the cross-correlation calculation function of signal V(t) matched to the projected signal U(t). The variable V(f) is the FFT of V(t) and U*(f)' is a complex conjugate of the FFT of V(t). $R_{uv}(t)$ is fed from envelope detector section 24 to feature extractor portion 26 where the feature extraction function is performed within computer 23.

As mentioned above, the computer selected is a model PDP-11 marketed by Digital Equipment Corporation of Manard, Massachusetts. The envewlope detection algorithm of Appendix A is used to create the target features for both the known targets and unknown targets which are stored in library file portion 28 of the computer.

Looking to FIGS. 3 and 4, the extracted features of an unknown target are compared in highlight matching or comparator portion 29 with features of each target stored in library file portion 28. This comparison is in accordance with the computer program of Appendix B entitled *Highlight Matching and Feature Extraction Algorithms*. The comparison is performed by first taking the features from a known target in library file portion 28 and then creating an n-element vector by dividing time-axis over which the echo was collected into n-time bins. Each of the elements of the n-element vector will have a non-zero value only if the probability of occurrence of a highlight in that bin is above a threshold probability. The values of the element are highlight amplitude normalized by the amplitude of the largest highlight.

If two highlights occurred in a bin, the largest is used. An n-element vector is also created for the unknown target which will be compared to each of the known targets in the library file.

The comparison in function section 29 and provided by the program of Appendix B involves calculating the Euclidian distances between the time-domain features of the unknown echo and those of each known target in the library file. Let a $_{ri}$ and $a_{ui}$ be the normalized highlight amplitude in the i-th time bin of a reference echo and the unknown echo, respectively. The Euclidian distance, d, between the features of the reference and the unknown echoes is:

$$d^2 = \sum_{i}^{n} (a_{ri} - a_{ui})^2$$

The Euclidian distance, therefore, is a measure of the similarity between the extracted test and reference features. If the unknown target is the same as one of the targets in the library, it will be identified and the proper indication will be generated at an output 35. If the unknown target is not the same as one of the targets in the library file, the computer program of Appendix B will cause computer 23 to specify which target most closely matches the unknown target and the degree of similarity between the unknown target and reference targets.

However, this disclosed concept lends itself to further modifications such as shown in FIGS. 5 and 6 to allow at least the envelope detection function 24' to be accomplished by more established, conventional means. That is to say, an envelope detection 24' could consist of a series of capacitors, resistors, and at least one diode to produce an absolute value function (a positive number) of an analog signal. This absolute value function would then be fed through an appropriately interconnected analog to digital convertor 21'', which would feed the digital form of the information to a modified computer that would perform the feature extraction functions 26' and storage 28' and comparison functions 29' that would be substantially the same as outlined above. The modified computer would have its computing needs tailored to be accommodated by a suitable program to accomplish essentially the same results. Such programming could be provided by one skilled in the art without undue experimentation.

Figure 7:
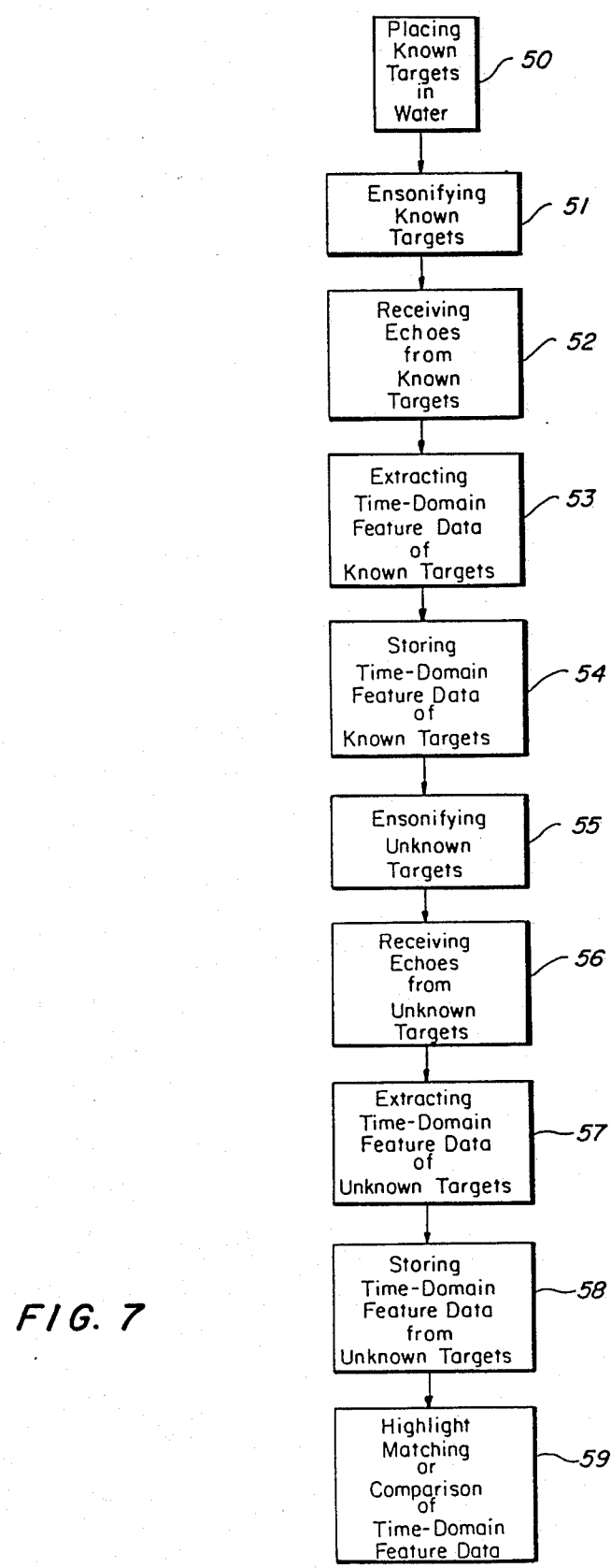
FIG. 7 depicts the method of the invention.

The method recognizing and/or discriminating between a variety of known targets and an unknown target first is depicted in FIG. 7 and calls of the collecting of data from a list of known targets in library file section 28. These targets are of high interest and likely to be encountered and use an appropriate broadband pulse sonar signal for ensonifying the known targets. The characteristics, or rather features, of interest of each known target are obtained by placing 50 known targets in water, and ensonifying 51 a target with a multiple number of pings usually greater than 10 and receiving 52 the echoes from the known targets. The multiple echoes are used so that variations in the echoes from ping to ping due to target motion can be accounted for. Next the extracting 53 of the features of interest to describe a known target occur. These features are the amplitudes of each echo highlight, the time separation between highlights and the probability of a given highlight being present. After a target is examined at different aspects relative to the sonar position, a storing 54 of these features is made in a memory file (library file 28) of computer 23.

Substantially the same apparatus used to ensonify known targets and classify the echoes is applied to determine the identity of an unkonwn target by ensonifying 55 the unknown targets. Upon receiving 56 echoes from the unknown target, there is the extracting 57 of, the time-domain features of the unknown echoes which are classified in accordance with the extraction technique referred to above. Optionally a storing 58 of the unknown target data is needed. Comparing 59 the extracted features of the unknown target in a highlight matching or comparator section 24 or 29' of computer 23 with known targets in library file 28 of known target features allows identification of the targets.

The embodiments thusly discussed, use a computer appropriately programmed to perform the sectional functions of envelope detection 24, feature extraction 26 storage 28, and comparison 29. While a model PDP of Digital Equipment Corporation was referred to, an IBM-PC or other computers appropriately programed could be substituted with appropriate programming modifications to accomplish substantially the same results.

Obviously, many modifications and variations of the present invention are possible in the light of the above teachings. It is therefore to be understood that within the scope of the appended claims the invention may be practiced otherwise than as specifically described.

What is claimed:

1. A method of utilizing a broadband sonar having a Q of between 2.5 and 3.5 for target discrimination in accordance with time separation and amplitude of echo highlight features that the human auditory system uses comprising:

ensonifying known targets in the water with multiple broadband transient signals;

receiving echoes from each of the known targets;

extracting time-domain feature data from the known target echoes to construct a library of target features based on the time-domain feature data of position and amplitude of echo highlights at which the slope of an envelope detected signal changes from positive to negative;

ensonifying at least one unknown target by substantially the same multiple broadband transient signals;

receiving echoes from the unknown target;

extracting time-domain feature data from the unknown target echoes in the same manner as for the known targets which consist of time-domain feature data identifying the position and amplitude of unknown target echo highlights in which the slope of the envelope of the detected signals changes from positive to negative;

comparing the time-domain feature data of echoes from the unknown target with time-domain feature data of the known targets to enable a recognizing and discrimination of targets of interest; and storing the time-domain feature data from the known target echoes prior to the step of comparing, the steps of extracting include obtaining the Hilbert transform from a fast Fourier Transform of the envelope of the echoes to arrive at an analytic signal for a feature extraction of the time-domain feature data.

2. A method according to claim 1 in which the ensonifying of known targets includes the placing of a known target in the water and transmitting multiple broadband transient signals to ensonify same.

3. A method according to claim 2 in which the step of extracting time-domain feature data from the unknown target echoes includes the matched filtering of the signals, the unknown target echoes with a signal of projected reference signals to allow the successful extraction when signal-to-noise ratios are less than 20 dB.

* * * * *